US007219438B2

United States Patent
Amron et al.

(10) Patent No.: US 7,219,438 B2
(45) Date of Patent: May 22, 2007

(54) SYSTEM FOR OPERATING ONE OR MORE SUSPENDED LASER PROJECTORS TO PROJECT A TEMPORARY VISIBLE IMAGE ONTO A SURFACE

(75) Inventors: Alan B. Amron, Syosset, NY (US); Brian K. Dinicola, Monroe Township, NJ (US)

(73) Assignee: First Down Laser, LLC., New York, NY (US)

( * ) Notice: Subject to any disclaimer, the term of this patent is extended or adjusted under 35 U.S.C. 154(b) by 0 days.

(21) Appl. No.: 11/109,331

(22) Filed: Apr. 19, 2005

(65) Prior Publication Data
US 2005/0183273 A1    Aug. 25, 2005

Related U.S. Application Data

(63) Continuation-in-part of application No. 10/838,057, filed on May 3, 2004, now Pat. No. 6,895,677, which is a continuation-in-part of application No. 10/385,219, filed on Mar. 10, 2003, now Pat. No. 6,796,041, and a continuation-in-part of application No. 10/385,218, filed on Mar. 10, 2003, now Pat. No. 6,751,880, which is a continuation-in-part of application No. 10/320,304, filed on Dec. 16, 2002, now abandoned.

(51) Int. Cl.
*G01C 15/06* (2006.01)
(52) U.S. Cl. .................... 33/289; 33/DIG. 21; 473/490
(58) Field of Classification Search ................. 33/227, 33/286, 289, DIG. 21; 353/28; 362/233, 362/244, 250, 259, 285, 553; 473/415, 490
See application file for complete search history.

(56) References Cited

U.S. PATENT DOCUMENTS

| 3,300,861 | A | * | 1/1967 | Lilly | 33/289 |
| 3,741,662 | A | * | 6/1973 | Pioch | 473/490 |
| 3,752,588 | A | * | 8/1973 | Chapman | 33/289 |
| 4,090,708 | A | * | 5/1978 | McPeak | 33/289 |
| 4,710,819 | A | * | 12/1987 | Brown | 248/660 |
| 4,818,049 | A | * | 4/1989 | Assenheim et al. | 362/553 |
| 5,976,039 | A | * | 11/1999 | Epel et al. | 473/490 |
| 6,688,755 | B2 | * | 2/2004 | O'Meara | 362/259 |
| 6,751,880 | B1 | * | 6/2004 | Amron et al. | 33/289 |
| 6,796,041 | B2 | * | 9/2004 | Amron et al. | 33/289 |
| 6,895,677 | B2 | * | 5/2005 | Dinicola | 33/289 |

(Continued)

*Primary Examiner*—G. Bradley Bennett
(74) *Attorney, Agent, or Firm*—Brian Dinicola

(57) ABSTRACT

A temporary visible image, such as a first down reference line, corporate logo, or text is projected onto a target surface by an orientation-stabilized, fiber-fed laser projector. The projector may include at least one cylindrical lens or at least one pair of X-Y scanners. One or more remotely located lasers, supplying optical energy at a single wavelength to the projector, accommodate projection of a monochromatic line pattern. Multi-colored images are accommodated by supplying, to the projector, the output of a plurality of lasers operating at different wavelengths within the visible band. The projector is suspended and conveyed as a unitary assembly by a suspension system adapted to maintain the projectors angular orientation and dynamically stabilize the image. If desired, two or more independently-suspended projection modules or groups of modules adapted to move in unison or independently over the length of the field may be employed.

17 Claims, 7 Drawing Sheets

U.S. PATENT DOCUMENTS

| | | |
|---|---|---|
| 2002/0125324 A1* | 9/2002 | Yavid et al. ............ 235/462.45 |
| 2002/0149940 A1* | 10/2002 | Fruhm et al. ............... 362/286 |
| 2002/0151385 A1* | 10/2002 | Hemphill ................... 473/415 |
| 2002/0178596 A1* | 12/2002 | Malard et al. ................ 33/286 |
| 2005/0083697 A1* | 4/2005 | Filep .......................... 362/285 |
| 2006/0103811 A1* | 5/2006 | May et al. ..................... 353/69 |

* cited by examiner

SYSTEM FOR OPERATING ONE OR MORE SUSPENDED LASER PROJECTORS TO PROJECT A TEMPORARY VISIBLE IMAGE ONTO A SURFACE

REFERENCE TO RELATED APPLICATIONS

This application is a continuation-in-part of U.S. patent application Ser. No. 10/838,057 filed on May 3, 2004 now U.S. Pat. No. 6,895,677 and entitled "SYSTEM FOR OPERATING ONE OR MORE LASERS TO PROJECT A VISIBLE LINE ONTO A SURFACE" which is a continuation-in-part of U.S. patent application Ser. No. 10/385,219 filed on Mar. 10, 2003 and entitled "SYSTEM FOR OPERATING ONE OR MORE SYNCHRONIZED LASERS TO PROJECT A VISIBLE LINE ONTO A SURFACE", now U.S. Pat. No. 6,796,041 and of U.S. patent application Ser. No. 10/385,218 filed on Mar. 10, 2003 and entitled "SYSTEM AND METHOD FOR OPERATING GROUPS OF LASERS TO PROJECT A VISIBLE LINE OF DEMARCATION ONTO DISCRETE REGIONS OF AN ATHLETIC FIELD", now U.S. Pat. No. 6,751,880, both of which being continuations-in-part of U.S. patent application Ser. No. 10/320,304 filed on Dec. 16, 2002 and entitled "SYSTEM AND METHOD FOR DYNAMICALLY MARKING ATHLETIC FIELDS USING A HANDHELD USER INTERFACE".

BACKGROUND OF THE INVENTION

1. Field of the Invention

This invention relates generally to the projection of visible lines onto surfaces upon which persons may be standing (e.g., athletic fields during sporting or entertainment events) and, more particularly, to systems employing laser light beam sources to generate such visible lines.

2. Discussion of the Background Art

In the game of football, a key objective of the team in possession of the ball (i.e., the "offense") is to retain possession of that ball by moving it far enough down the field. Specifically, the offense is given a set of four plays or "downs" to advance the ball by at least ten yards. Each time that distance is reached or exceeded, the offense is said to have crossed a "first down" line, a new set of downs is earned, and the offense is allowed to continue its advance toward the goal line of the opposing team (i.e., the "defense"). If the offense falls short, however, possession is lost and the two teams reverse their roles. A regulation football field has a length of 100 yards and 53 yards. Thus, by way of example, a team gaining possession of the ball at its own 20 yard line must move the ball a total of eighty yards in order to reach the end zone of the opposing team.

In numerous occasions throughout an average football game, the officials of the game must resort to sideline markers to establish whether the offense has advanced the ball by the required distance. The standard alignment system that is utilized is generally a pair of poles connected by a 30 foot long chain. The relative position of the football is measured by locating a first of these poles at the approximate location of the initial line of scrimmage and moving the second as far forward as possible. Each time this measurement is made, the game must be delayed and the yard markers must be carried from the sidelines to the place on the field where the official has "spotted" the ball. Although the game of football has become a relatively complex sport, involving literally hundreds of millions of invested dollars, this time consuming system has remained relatively the same since the conception of the sport.

A number of approaches intended to ameliorate the aforementioned deficiencies have been proposed over the years, but none of them has met with any degree of commercial success. U.S. Pat. No. 3,741,662, entitled "VISIBLE LINE MARKER" and issued to Pioch on Jun. 26, 1973, U.S. Pat. No. 3,752,588, entitled "LASER FOOTBALL FIRST DOWN MEASURING DEVICE" and issued to Chapman on Aug. 14, 1973, and U.S. Pat. No. 4,090,708 entitled "APPARATUS FOR MARKING FOOTBALL FIELDS" and issued to McPeak on May 23, 1978. Each of the aforementioned patents involve the use of lasers for the purpose of marking visible lines of demarcation on an athletic field. One of the principal drawbacks of these systems is the time-consuming and tedious method of operation.

Both Chapman and Pioch involve the use of track mounted, sliding projectors that are located at the sidelines and several feet above the field level. The lasers are mounted for oscillation in a vertical plane and the projected, low intensity beam developed by each must strike the field at points of reference lying on an imaginary line of demarcation defined by the intersection of the vertical plane with the field surface. Accordingly, it is necessary for the operator to manually position the projector for each reference point established. Like Pioch and Chapman, McPeak discloses the use of a laser assemblies adapted to accommodate sliding movement along the sidelines of a football field. McPeak, however, teaches that two oppositely directed beams should be aimed at a level above (i.e., "adjacent and parallel to") the field surface.

Another drawback associated with the aforementioned systems is that the low-intensity output of these lasers is far too low to be visible by the players, let alone by an audience in, for example, a stadium setting. Indeed, the aforementioned systems are intended for use only in making a first down measurement determination after each close play. As it turns out, players intent on getting the ball past the first yard line—and focused on the sideline markers long enough to be "blindsided" by the defense—have suffered very serious neck and back injuries.

Television networks have recently implemented an image pre-processing system which allows viewers of televised football games to see a so-called "virtual" first down line that digitally projects, in real time, a visible line onto video frames recorded by the television camera, the line being displayed on a viewer's television set so that it appears to extend between the first down sideline markers. Unfortunately, neither the players, game officials, nor the fans attending such games can actually see this virtual line. It is thus reasonable to conclude that given the rapid and widespread adoption of a virtual visible line marking system—whose enjoyment is strictly limited to television viewers, it has heretofore been deemed impossible or impracticable to project a real, visible line onto the grassy surfaces which characterize most athletic fields.

A continuing need therefore exists for a visible line or image marking system that is simple to operate, accurate enough to allow its use by officials at sporting events, and of sufficient intensity to be viewed by players, large audiences, and television viewers alike.

A need also exists for a system capable of projecting, onto surfaces that are characterized by uniform and/or non-uniform topological features, a line which can be seen from different perspectives and from considerable distances—even in daylight conditions.

A need also exists for a system that is capable of projecting a line which, though intense enough to be seen from a wide range of viewing angles, conforms to all applicable eye-safety regulations such as those promulgated by the FDA's Center for Diagnostic and Radiological Health (CDRH).

A need also exists for a system that is flexible enough so that it can be used to project images comprising one or more linear or curvilinear line segments, with the images being either monochromatic or multicolored, as desired.

SUMMARY OF THE INVENTION

The aforementioned needs are addressed, and an advance is made in the art, by an apparatus for providing at least one temporary visible reference line or other image on a target surface, as for example, an athletic field. A system constructed in accordance with an illustrative embodiment of the present invention comprises In accordance with an exemplary embodiment of the present invention, at least one position-stabilized, laser light source (or laser light sources, as the case may be) comprises an optical fiber-fed, projection module dimensioned and arranged at an elevated location relative to the target surface. The projection module is fed by one or more remotely located, high-powered lasers (which may be, for example, on the order of about 40 to 150 W). A projection module constructed in accordance with an illustrative embodiment of the present invention includes a cylindrical lens dimensioned and arranged to distribute the optical energy received from the laser(s) along a linear path. Alternatively, the projection module may include one or more X-Y scanning assemblies adapted to direct a corresponding number of beams at the target surface. Such an arrangement enables a broad range of monochromatic and/or multicolored images to be projected upon any desired region of the target surface. As such, a system constructed in accordance with the teachings of the present invention may be used in accordance with one mode of operation to project a temporary reference line, such as a first down reference marker onto a selected region of an athletic field and, in accordance with another mode of operation, to project a corporate logo, artistic design, or text message onto a selected region of the athletic field.

The projection module is supported at an elevated location above the target surface by a suspension system that incorporates a sensor adapted to detect the angular orientation of the projector module relative to a preferred orientation of the projection module and with respect to at least two axes of rotation. The suspension system further includes a motorized drive system adapted to make adjustments to the position of the projection module in order to maintain it in the preferred orientation. Adaptively stabilizing the angular orientation of the projection module prevents jarring movements of the image projected upon the target surface, making it suitable for use in projecting a reference line despite wind gusts, building vibrations, and the like. In accordance with an exemplary embodiment of the invention, the suspension system is further adapted to move the projection module relative to the longitudinal and transverse axes of the target surface. Thus, the projection module can be conveyed from a first, position-stabilized location from which an image can be projected upon a first region of the target surface to a second, position-stabilized location from which an image can be projected upon a second region of the target surface.

Under certain ambient lighting and other installation conditions, it is contemplated that a surface may be divided into multiple regions or zones. This allows the distance over which each beam must travel to be kept within a range that is consistent with the intensity, divergence and line width demands for proper viewing. Also, it avoids the problem of interruptions in the projected beam(s) which might be caused by a suspended camera platform or other movable or fixed structure disposed above the target surface. In that regard, and by way of illustrative example, it may be desirable to longitudinally divide a target surface such as a football field into two regions with each of two projection modules being supported by a respective suspension system and movable within a corresponding region. Indeed, providing an arrangement of plural, independently movable, suspended projection modules has a number of unique advantages. For example, in the context of a football event, it would be possible to utilize one projection module to project light within a vertical plane that extends upwardly from the line delineating the end zone while using another projection module to project light within a plane that extends upwardly from the first down line. By way of further example, the left and right boundaries of a field goal might be delineated using first and second, parallel vertical planes of light each projected by a corresponding one of the projection modules. By way of yet another example, during halftime, multiple advertisements, logos, and the like may be simultaneously directed to discrete groups of fans in the stadium depending upon their viewing angle.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description are merely exemplary of the invention, and are intended to provide an overview or framework for understanding the nature and character of the invention as it is claimed.

BRIEF DESCRIPTION OF THE DRAWINGS

The invention will be better understood by reference to the detailed description of the invention that follows, taken in conjunction with the accompanying drawings, in which.

DETAILED DESCRIPTION OF THE INVENTION

Figure 1:
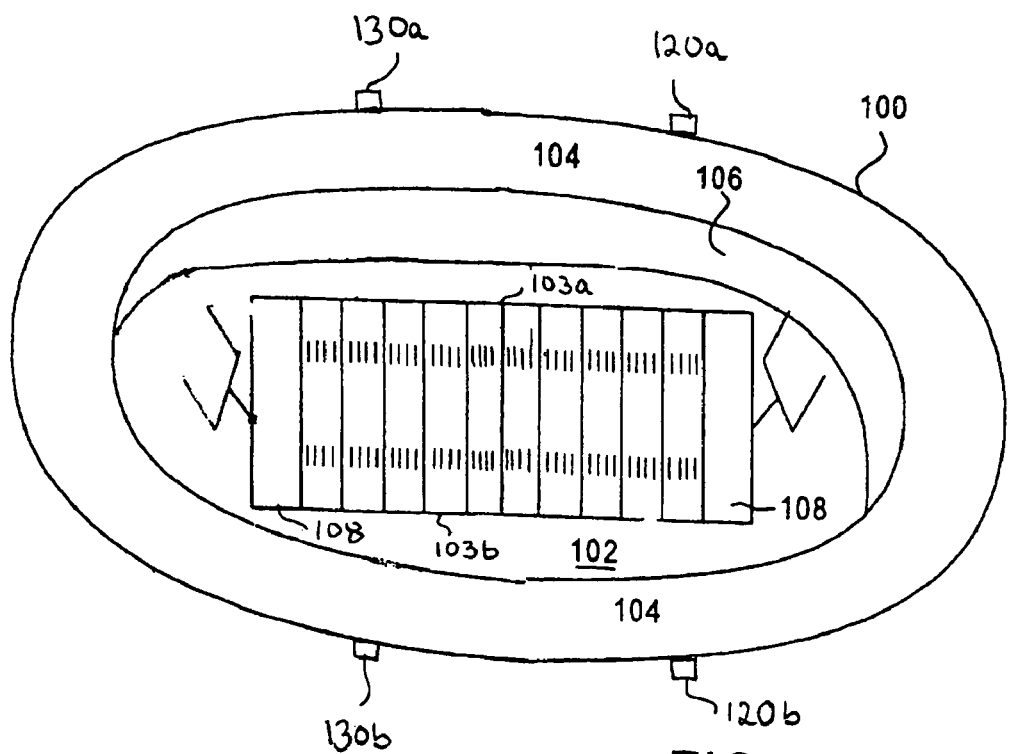
FIG. 1 is a perspective view of a football stadium equipped with a visible line marking system in accordance with an illustrative embodiment of the present invention.
Figure 2:
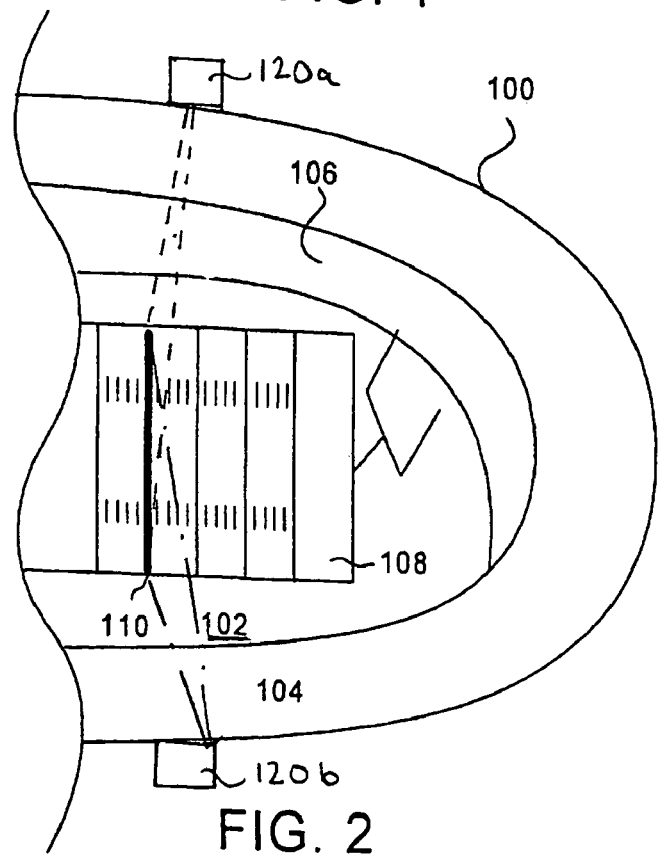
FIG. 2 is a partial perspective view of the football stadium of FIG. 1, depicting the projection of a visible line of demarcation (i.e., a "first down" line) onto a portion of the field surface covered by real or artificial grass.

In connection with the exemplary football stadium installation depicted in FIGS. 1 and 2, it will be understood that the term "target surface" refers to the surface of an athletic field that is entirely or substantially covered by real or artificial turf grass. By appropriate beam wavelength, output power level selection, and/or placement of multiple laser sources, the poor light scattering performance of such non-smooth surfaces can be overcome so that spectators can easily see the line(s) so-projected—from most, if not all, vantage points within the seating area or a stadium or arena—even in peak daylight ambient lighting conditions. It should thus be understood that although the exemplary, embodiments illustrated and described herein relate specifically to the projection of a visible straight line onto the grass surface of a football field, the teachings of the present invention are equally applicable to the projection of other types of lines—including images, logos, advertising messages, and the like—onto any surface covered by real or artificial turf.

FIG. 1 is a partial view of an exemplary stadium 100 having associated therewith a visible line marking system constructed in accordance with the teachings of the present invention. In the center of stadium 100 is an athletic field 102 covered with grass—which can be either real or artificial turf grass—and marked with a rectangular grid pattern to define a football playing area. The width of this grid pattern is delineated by, inter alia, first and second lateral boundary lines indicated generally at 103a and 103b, which are separated by a distance of approximately fifty-three yards. At regular increments of ten yards, eleven transverse reference lines extend across field 102, interconnecting first and second boundary lines 103a and 103b. Collectively, these transverse reference lines define the one hundred yard area of field 102 that separates the end zones 108 of each team.

Surrounding the grass-covered surface of football field 102 is a seating area, indicated generally at 104, designed to accommodate a large number of spectators. As will be readily appreciated by those skilled in the art, the seating area of a typical professional league football stadium can easily accommodate several scores of thousands of fans, and many college arenas provide seating for at least tens of thousands. In that regard, seating area 104 can consist of three or more distinct tiers as, for example, a lower deck, mezzanine, and upper deck area. Between seating area 104 and playing field 102 is a retaining wall 106, which serves as a barrier between the spectators and the players and officials on field 102. It goes without saying that the spectators expect a substantially unobstructed view, from any seat within seating area 104, of the action taking place on field 102.

A line marking system constructed in accordance with an illustrative embodiment of the present invention includes a first pair of laser sources indicated generally at 120a and 120b and a second pair of laser sources indicated generally at 130a and 130b. To ensure coverage of the entire length and width of the playing area, each laser source is positioned at a location that is high above the grass-covered surface of field 102—on the order of from about fifty to about two hundred and fifty feet or so depending upon the intensity, shape and divergence of the coherent beam generated and upon the availability of a suitable mounting location. Although it is conceivable that certain enclosed (e.g., domed) environments might offer a mounting location that is directly above athletic field 102, each laser source as sources 120a and 120b is typically mounted well beyond lateral boundary lines 103a and 103b—on the order of, say, about fifty to one hundred and fifty feet outside lines 103a and 103b. In the exemplary embodiment of FIG. 1, for example, each laser source is positioned directly above seating area 104, with care being taken to ensure that the respective beams projected are sufficiently distant from the spectators at all times as to comply with the guidelines prescribed by the Center for Diagnostic and Radiological Health, a department of the U.S. Food and Drug Administration. The beam may therefore traverse a distance of hundreds of feet before reaching the surface of field 102, and may do so at an angle of incidence that is typically within a range of from about fifteen to about ninety degrees.

Under certain ambient lighting and other installation conditions, it is contemplated that a surface may be divided into multiple regions or zones. This allows the distance over which each beam must travel to be kept within a range that is consistent with the intensity, divergence and line width demands for proper viewing. By way of illustrative example in which the surface is a football field that is subject to daylight illumination conditions, first and second laser sources 120a and 120b may be positioned above opposite lateral sides of the 25 yard line to provide coverage for half the area of field 102—a region designated as area 102b in FIG. 3, while third and fourth laser sources 130a and 130b may be positioned opposite lateral sides of the 25 be yard line on the other half of the field, a region designated as area 102a in FIG. 3. Such an installation decreases the maximum angle, relative to the vertical, at which each beam strikes field surface 102. A beam emitted by laser source 120a from a point 200 feet above a lateral side of the 25 yard line will be disposed entirely in a vertical plane relative to horizontal target surface 102b, and thus at an angle of zero degrees relative to the vertical. A beam directed from that same source but along a selectable path 25 yards away (e.g., at the 50 yard line) will strike target surface at an angle of twenty degrees relative to the vertical. To be useful as an official line of demarcation in a football game, it is believed that the angle should be no greater than 20 degrees. This is because the tip of the football is three inches above the ground. In the foregoing example, the trailing edge of the visible composite line will cross the tip of the football about one inch in front of where it actually crosses the field. The greater the greater the angle, the greater the deviation.

Figure 3:
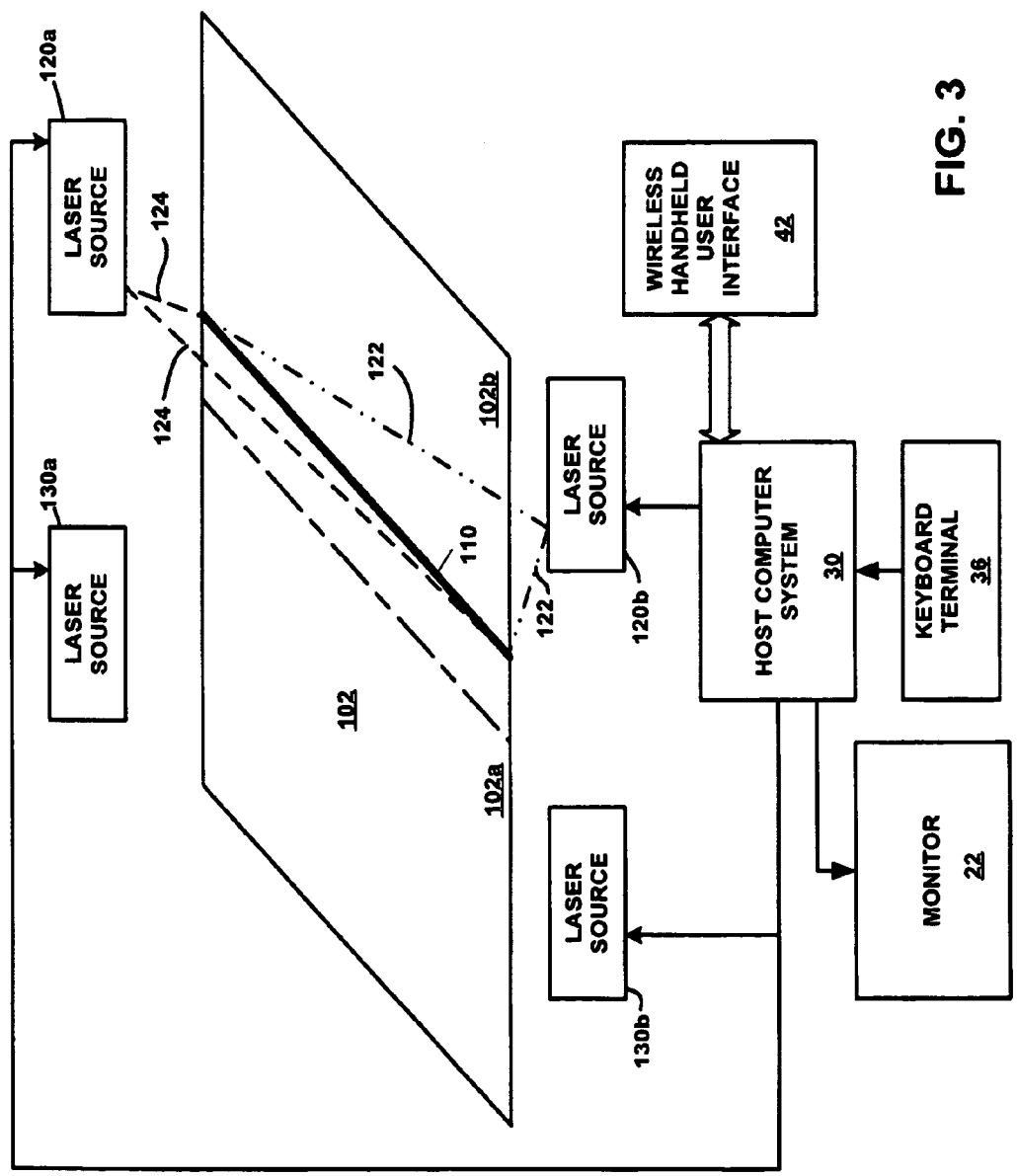
FIG. 3 is a block diagram schematically depicting the components of an exemplary visible line marking system employing two pairs of synchronized coherent laser sources.

As such, and in accordance with the illustrative embodiment of the present invention depicted in FIG. 1, each pair of laser sources is dimensioned and arranged within stadium 100 to provide coverage for only a portion of the entire of the field area. As best seen in FIGS. 2 and 3, laser sources 120a and 120b—in a manner to be described shortly—are operated together so as to jointly project, from two different angles, a composite visible line 110 onto the field region 102b. As indicated above, by appropriate beam wavelength, output power level selection, and placement of the multiple laser sources, the poor light scattering performance of the grassy field surface 102 can be overcome and spectators can easily see the line so-projected from most, if not all, vantage points within seating area 104—even in peak daylight ambient lighting conditions.

A simplified block diagram of an illustrative visible line marking system 10 constructed in accordance with the teachings of the present invention is shown in FIG. 3. Essentially, system 10 includes a plurality of groups of laser sources, of which only a first group (comprising first laser source 120a and second laser source 120b) and a second group (comprising third laser source 130a and fourth laser source 130a) are shown. It will readily appreciated by those skilled in the art that any number of intermediate groups of laser sources may be added, and the relative spacing between the sources of all groups adjusted, in order to ensure that the projected line 110 (FIG. 2) can be clearly seen from all desired viewing angles.

In this regard, the inventors herein have observed that the intensity of light reflected by grassy surfaces is subject to substantial local variations depending upon the vertical and angular position of the observer relative to the location where a laser beam strikes a region of the target surface. In locations where the amount of ambient illumination is relatively high such, for example, a stadium whose grass field is exposed to full sun or even bright incandescent lighting, light projected by a single coherent laser source is reflected by the randomly oriented blades of grass in such a way that it can be clearly seen from some seating locations and barely seen from others. In accordance with the illustrative embodiment of the present invention depicted in FIGS. 3 and 4, the light from two or more optical sources, as scanned beam 124 output by first laser source 120a and scanned beam 122 output by second laser source 120b, are used in order to ensure that the light reflected by target surface 102b can be clearly seen from any viewing location.

With continuing reference to FIG. 3, it will be seen that the respective laser sources are controlled by host computer system 30, with which there are associated a monitor 22, a keyboard terminal 36, and a hand-held wireless interface 42. In the exemplary embodiment, the software controlling movements of the beams developed by each laser source is configured to allow line projection position and operation commands to be supplied by either keyboard terminal 36 or by wireless interface 42 (via an RF link). To make the most effective use of the capacity to implement line position commands using keyboard terminal 36, monitor 22 is configured to present a view (which may be an actual view taken by video camera or a digitally simulated scene) of football field 102. Alternatively, or in addition to the keyboard command capability, commands for position the visible line are entered by wireless interface 42 via an encrypted RF link.

As will be readily appreciated by those skilled in the art, an advantage of the keyboard implementation is that it is can be co-located with monitor more secured It will also be seen that field surface 102 (or any portion thereof) is within the view of at least one broadcast video camera indicated generally at 20. In accordance with the standard NTSC television interlaced format, the view is scanned at a rate of 30 Hz. Typically, the scanning format is an array of 488 (H) by 380 (W) charge coupled device (CCD) pixels, each of which generates a voltage level proportional to the intensity of light on that pixel element. An NTSC camera converts this sequence of pixel outputs to a standard RS 170 composite video signal of 525 lines, two fields per frame, fully interlaced format with a resolution of 488 lines per frame by 380 elements per line.

Figure 4:
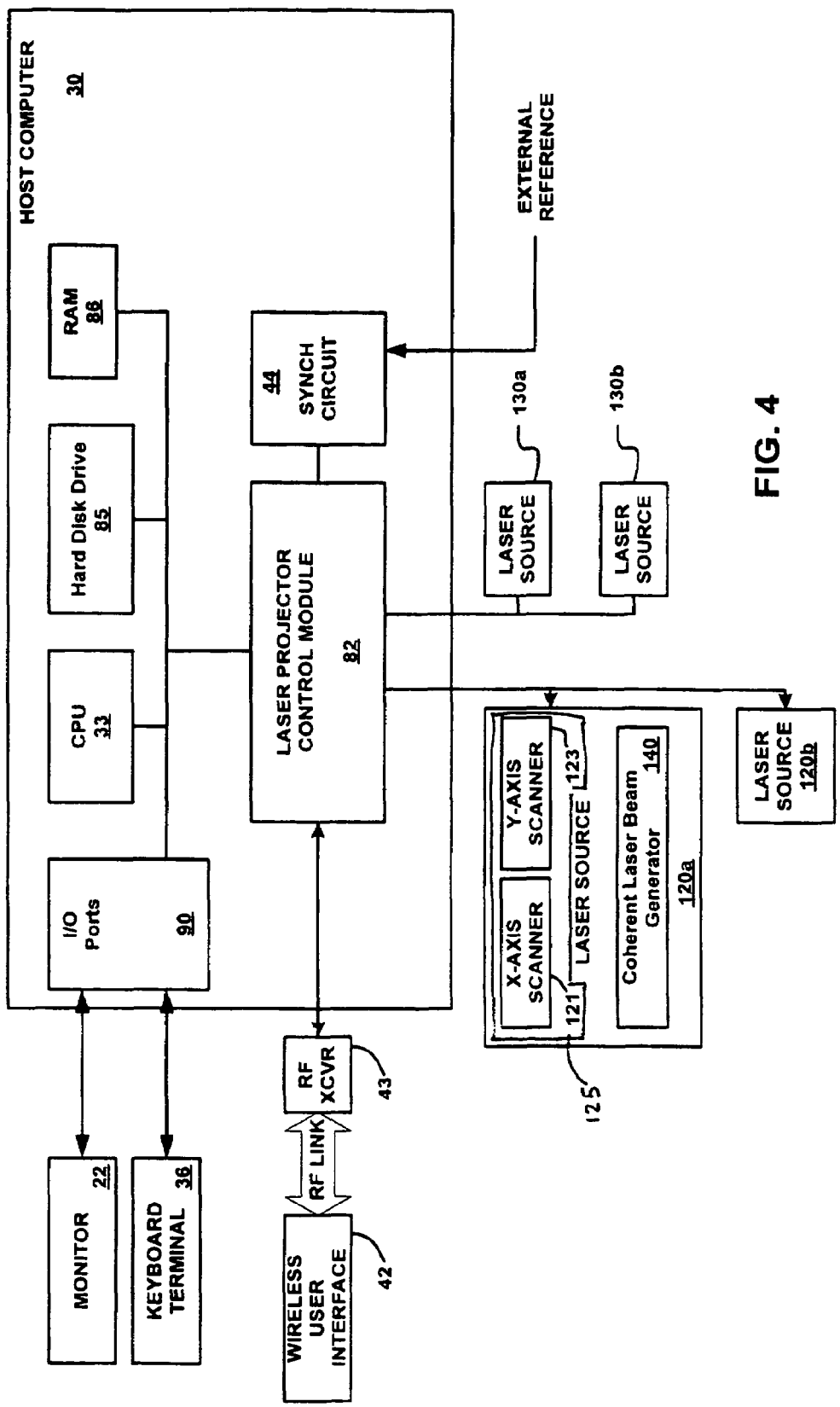
FIG. 4 is a block diagram depicting, in greater detail, the various functional elements of the exemplary visible line marking system of FIG. 3.

Turning now to FIG. 4, it will be seen that each laser source as source 120a comprises a orientation stabilized projection module 125 that includes first and second galvanic scanners indicated generally at reference numerals 121 and 123, respectively. Such scanners are found in conventional laser projectors, and as used therein, galvanic scanner 121 controls movement in the X-axis direction of a coherent laser beam developed by beam generator 140. Likewise, galvanic scanner 123 controls movement in the Y-direction. Considering the width direction of field 102 between boundaries 103a and 103b to constitute the Y-direction, a visible line is generated by causing beams 122 and 124 (FIG. 3) to move fast enough in that direction to create a composite temporary visible line at a desired location on target surface 16. The term orientation-stabilized is intended to refer to adaptively maintaining the angular orientation of the projection module relative to plural axes to compensate for the effects of building vibration, wind gusts, and other momentary disturbances which would otherwise produce sudden, jarring movements of the projected line or other image. By way of illustrative example, the projection module may be stabilized gyroscopically, or may employ angular position sensors and servo motors to adjust the orientation of the projection module relative to a preferred (e.g., true vertical) orientation.

Essentially, a composite visible line is formed at a desired location by repeatedly and rapidly scanning target surface 102 with each of beams 122 and 124 such that each beam strikes target surface 16 at many points along a selectable path. An exemplary selectable path is identified by reference numeral 110 in FIG. 2, it being understood that a change in the specific location of the temporary visible line—in this case a straight line across surface 102b—is implemented through operation of the respective X- and Y-scanners of each of laser sources 120a and 120b. As will be readily appreciated by those skilled in the art, each scanner as scanners 121 and 123 includes mirror (not shown) that deflects the beam. Working together, scanners 121 and 123 are operative to direct the corresponding beam at any selectable point within coverage region 102b so as to thereby generate a temporary visible line thereon.

To enable accurate positioning of a visible line along a selected path as path 110 (FIG. 2), scanners as scanners 121 and 123 are preferably closed-loop galvanic scanners (also called "position detecting" scanners). Scanners of this type are commonly used in the laser light entertainment industry and are compatible with a wide variety of commercially available laser graphics software packages. Acceptable performance has been achieved using scanners that are capable of directing the beam to 24,000 to 30,000 discrete points along selected path 110 every second. Scanning assemblies suitable for use in the present invention have been assembled, for example, using two of Cambridge Technology's model 6800 scanners and matching model 6580 amplifier circuit boards.

An advantage of employing an X-Y scanning assembly is that is may be operated, in accordance with one mode of operation, to project a temporary, visible reference line across the target surface and operative, in accordance with an alternative mode of operation, to project a temporary visible image having at least one curvilinear segment. The latter capability gives rise to the projection of corporate logos, slogans, text messages and the like that can be viewed, for example, by spectators in a stadium.

As a safety precaution, each laser projector preferably includes a conventional shutter mechanism (not shown) such, for example, as an acoustic optical modulator (AOM) for turning off the beam in the event, for example, a malfunction prevents proper movement of each scanning beam. In the event system 10 may be called upon to create two or more distinct and unconnected visible lines, the AOM's may also be used to implement a blanking function whereby the beam is turned off as it moves between them.

Optionally, each laser source may further include a conventional beam expander (not shown) in order to increase the diameter of the beam or a conventional collimator (not shown) for altering its divergence. In a typical stadium installation, it is anticipated that laser sources as sources 120a and 120b will be mounted anywhere from about 75 to about 200 feet above the level of target field surface 102. Consequently, beams 122 and 124 will traverse a considerable distance before striking surface 102b. As will be readily appreciated by those skilled in the art, the need for expansion or collimation of beams 122 and 124 is purely a function of the initial beam diameter and the desired thickness of the visible line as formed on the target surface. A more challenging aspect of projecting beams over such distances, especially in full sun illumination conditions, is that of finding lasers capable of delivering coherent beams of sufficient power and intensity to form a visible composite line.

For a line width of approximately six inches (15 cm), excellent results have been achieved in a stadium environment (i.e., from distances in excess of several hundred feet) using two 40 W, frequency doubled, Q-switched Nd:YAG lasers each adapted to generate laser pulses at a wavelength of 532 nm. Emission at this wavelength is especially preferred since it is very close to the peak (555 nm) of the human eye's sensitivity. By comparison, in an argon ion laser operating in continuous wave (cw) mode, roughly half of the output is at 514 nm (58% as bright as the same beam at 555 nm), another 30% is at around 480 nm (18% as bright) and the remaining 20% is at around 440 nm (barely visible to he human eye). Thus, an argon laser would theoretically have to deliver up to three or four times as much power to match the visibility of the Nd:YAG laser. Notwithstanding the relative difference in visibility, the inventors herein contemplate that one or more cw-mode lasers can be used in conjunction with one or more pulse mode lasers to provide a single, composite visible line, if desired. Moreover, and with particular regard to an illustrative embodiment that uses two laser sources to generate each visible line, it is also contemplated that the first laser source may be configured to deliver a beam which has a different power level than the second laser source, and that the respective power levels may be altered as necessary to compensate for different ambient lighting conditions.

The use of Nd:YAG lasers has heretofore been regarded as unsuitable for so-called laser graphics applications because they tend to produce dotted, rather than continuous lines. Advantageously, the use of two or more lasers in accordance with the teachings of the present invention overcomes this apparent deficiency by synchronizing the first and second laser sources such that segments of the broken pattern of elliptical spots produced by first laser source 120a overlap the broken areas between the elliptical spots produced by second laser source 120b. The resulting composite visible line appearing along selected path 110 thus appears to be continuous and unbroken to the human observer. If desired, a cylindrical lens can be used to define the appearance of each spot as a dotted line segment having a straight forward and trailing edge.

In any event, and with continuing reference to FIG. 4, it will be seen that the scanners associated with each corresponding laser source of the illustrative embodiment are controlled by a corresponding laser projector control module respectively identified by reference numerals 82a, 82b, 82c and 82d residing within host computer system 30. Acceptable results have been obtained using Pangolin QM2000 laser projection controller boards, available from Pangolin Laser Systems, Inc., Orlando, Fla. Essentially, each QM2000 board includes its own processor and memory storage resources, and is configured to execute a special software program (Pangolin LD2000) to directly control any ILDA-compliant scanner unit. A first of the projector control modules, control module 82a, is designated as a "master" controller and is configured to assign specific line projection tasks to the scanners (e.g., 121, 123) of its own associated laser source as well to those of the laser sources via "slave" projector control modules (e.g., 82b–82c). Utilizing the Pangolin LD2000 software package, it is possible to define a series of "scenes" each corresponding to a discrete position of the visible line to be projected.

Other components of host computer 30 include a conventional central processor unit as, for example, an Intel Pentium 4 2.0 GHz microprocessor unit, random access memory 86, a hard drive for storage of the operating system and communications program needed to define an interface between wireless user interface 42 and I/O ports 90 via radio frequency (RF) transceiver 43. A set of MIDI function commands input by local console 32 or wireless, handheld user interface 42 cause the program executing on master projector control module 82a to instruct an appropriate group of scanners to move the beams as needed to adjust the visible, composite temporary line from an initially selected position defined by a first "scene" stored in RAM of module 82a and corresponding to a selectable path as path 110 in FIG. 2, to a subsequently selected position defined by a second scene. Thus, for example, in the context of an illustrative football stadium installation, the temporary line may be moved from an initial line of scrimmage—where a game official has just "spotted the ball"—by a set distance of ten yards by the mere depression of a single pushbutton of user interface 42. This can also include moving the temporary visible line from an old line of scrimmage, forward or backward, to a new line of scrimmage as a result of a penalty assessed against one of the teams.

From the foregoing discussion it will be appreciated that system 10, as thus far described, is capable of creating temporary, visible composite lines which can be seen not only by players and game officials on the ground, but also by stadium audiences from distances in excess of hundreds of feet—despite the non-uniform light scattering properties of real and artificial grass. So long as the sweep frequency rate—the rate at which the visible line is refreshed by passing the beams across it—is at least thirty times per second, no flicker will be perceptible by the players, officials, or spectators present at the event. In order for the lines generated by system 10 to be properly seen by television audiences, however, it is necessary to synchronize the beam scanning process to the scan rate of the at least one television or video camera 20 having surface 102 within its field of view.

Assuming NTSC compliant operation, the sweep frequency rate must be an n multiple of the 30 Hz camera scan rate, where n is a whole integer greater than one (e.g., for n=2, the sweep frequency rate is 60 Hz). Since it is believed to be easier in most cases to trigger operation of the projector control modules rather than trigger the scan cycle of the broadcast video or television camera, an especially preferred embodiment of the present invention includes a phase-locked synchronization circuit 44 which synchronizes the operation of laser projection control modules 82a, 82b, 84a and 84b to the 60 Hz vertical blanking pulses of the video signal from broadcast camera 20. For a 30 Hz refresh rate, the 60 Hz vertical retrace output signal from camera 20 is coupled to a divide by 2 frequency divider (not shown).

Figure 5:
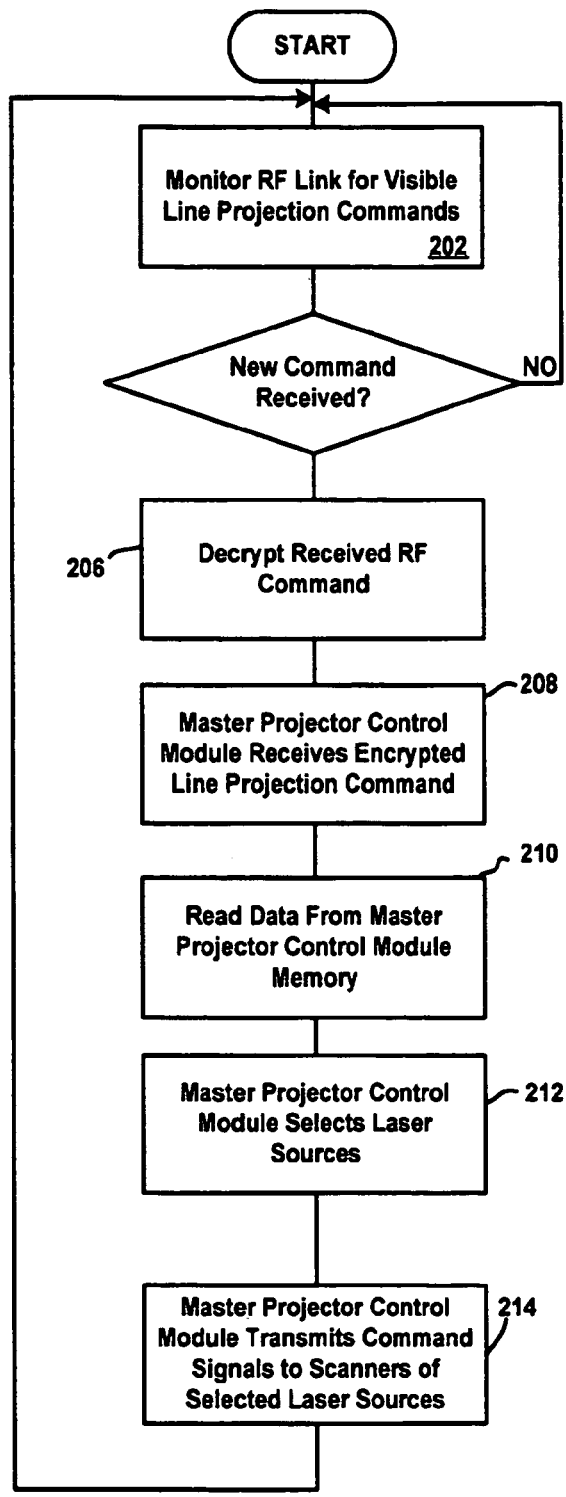
FIG. 5 is a flow chart depicting a sequence of operation for the exemplary system depicted in FIGS. 3 and 4.

With reference now to FIG. 5, an exemplary sequence of operating the illustrative visible line marking system depicted in FIGS. 1–4 will now be described. The process is entered at step 202 wherein a determination is made as to whether an n Hz synchronization signal is available from an external source such, for example, as a broadcast television camera. In most cases, the reference signal will be a 30 Hz or 60 Hz signal, though other n-multiples of 30 Hz are contemplated. If no reference signal is available, one is generated at step 204. Each laser projector control module is synchronized to the common reference signal so that all laser sources can be operated to sweep their associated beam across the field surface at the same precisely controlled rate (block 206).

Using a hand-held user interface, a game official enters commands instructing visible line system 10 as to the required location of dynamically movable line 110 (FIG. 2). An RF link between host computer 30 (FIG. 4) and this interface is continuously monitored for new line placement instructions (block 208). If a new line projection command is received (block 210), it is examined to determine whether it is a terminate command (block 212). If so, all line projection operations cease (block 214) and the process terminates. If not, the process proceeds to block 216 and a newly received line projection command is supplied to master projector control module. Using its own on board processing and memory resources, the master projector control module obtains scene information corresponding to the location of the visible line to be projected and an indication as to which slave projector control module(s) are required to operate the applicable laser sources (block 218). At block 220, sub-commands are supplied by the master control module to the appropriate slave projector control modules and these, in turn, deliver data to the scanners associated with the laser sources controlled by them. The process returns to block 208. Until a terminate command or new line projection command is received, system 10 projects the visible line at the location specified by the most recent projection command.

Figure 6:
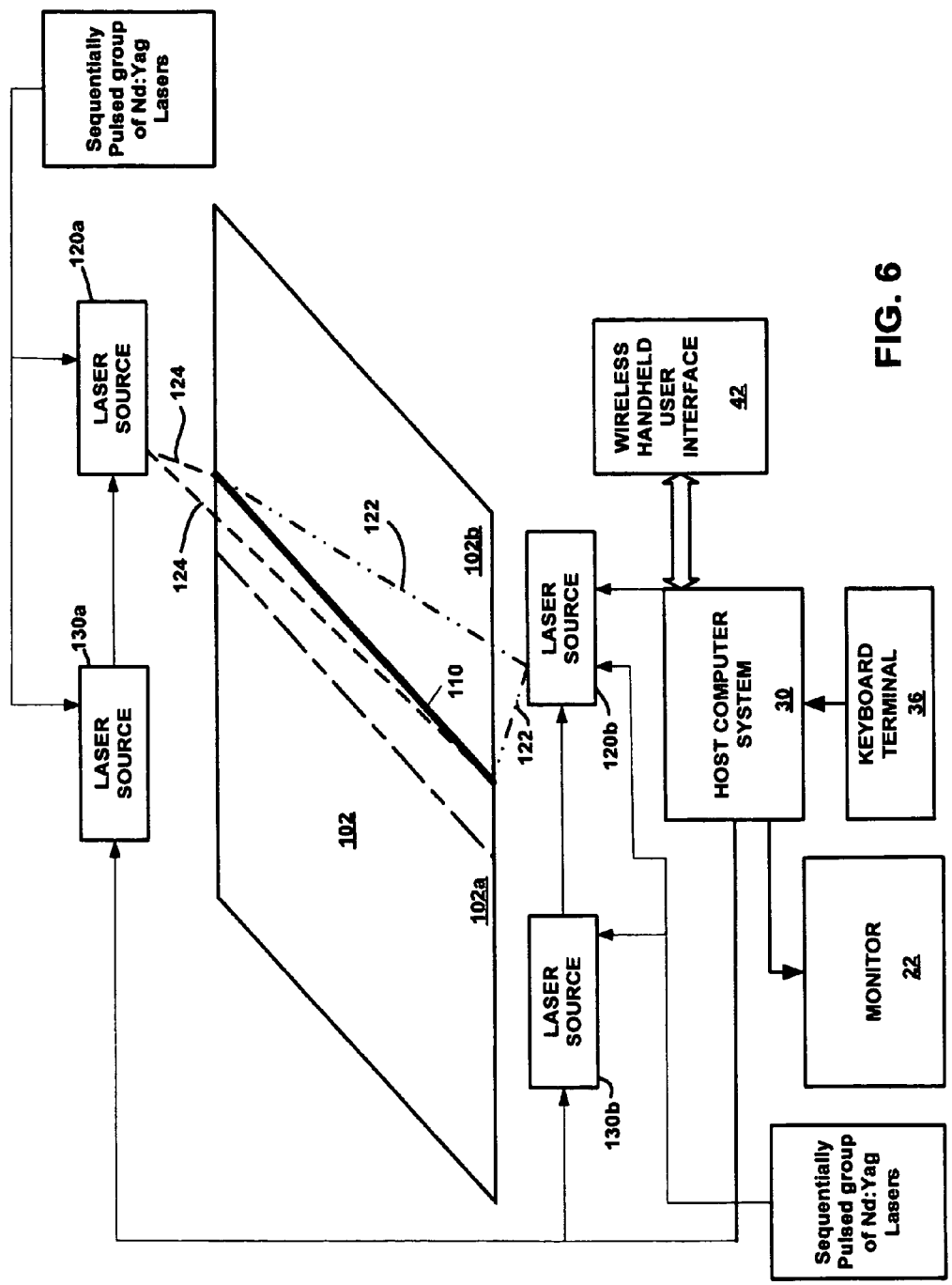
FIG. 6 is a block diagram schematically depicting the components of an alternate embodiment of a visible line marking system.
Figure 7:
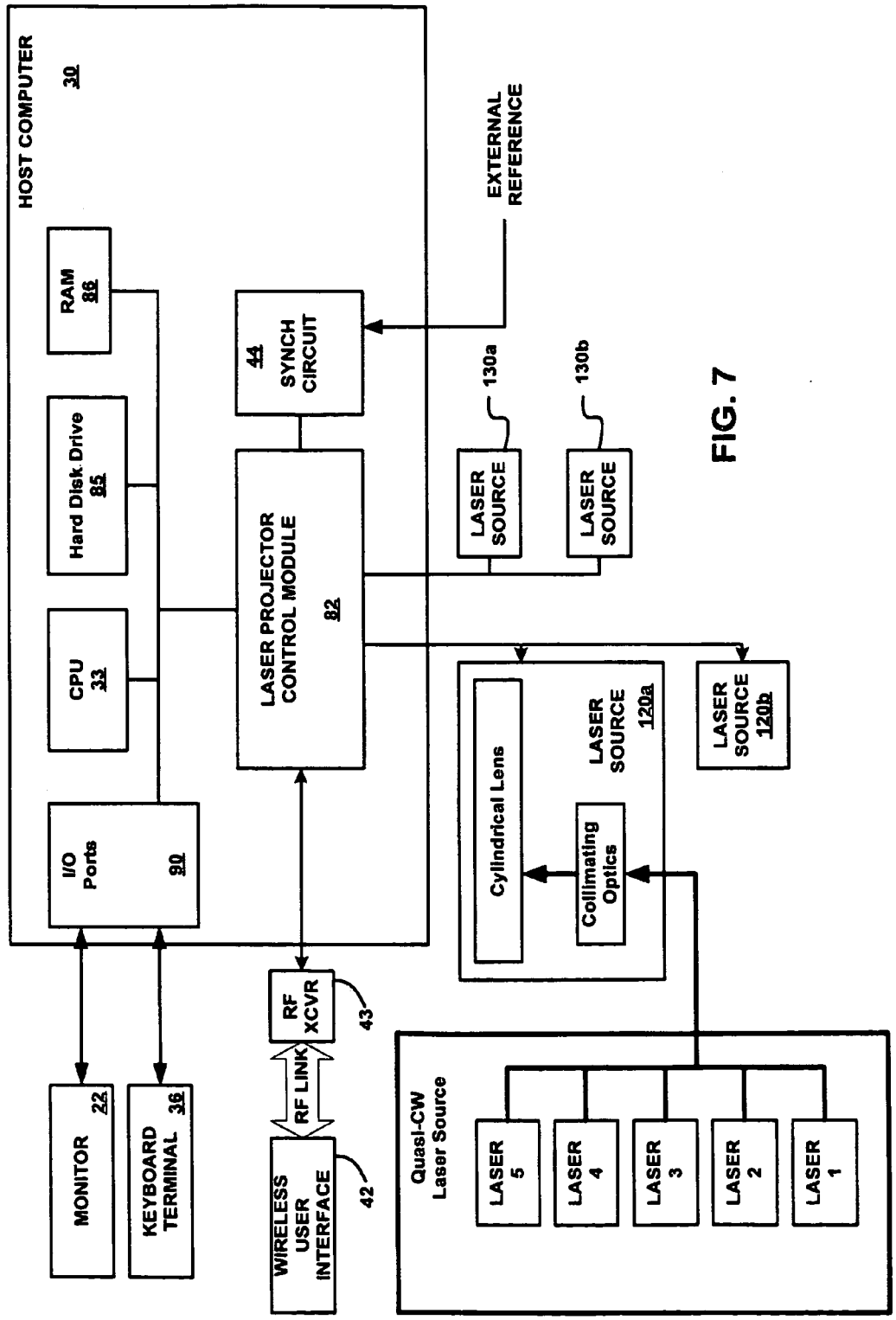
FIG. 7 is a block diagram depicting, in greater detail, the various functional elements of the alternate visible line marking system of FIG. 6.

Turning now to FIGS. 6 and 7, there is shown a further illustrative embodiment of the present invention. In the embodiment depicted in FIGS. 6 and 7, a plurality of sequentially pulsed Nd:YAG lasers whose respective outputs are fiber fed into an optical combiner used to supply one or more laser sources as sources 120b and 130b with the requisite optical energy. Although an arrangement in which two separate groups of pulsed lasers are used to feed respective lateral groups of laser sources is shown, other arrangements are also possible. For example, the lasers may be consolidated into a centralized, environmentally controlled enclosure situated in such a way as to allow an optical fiber to feed each of laser sources 120a, 120b, 130a and 130a. Though each individual laser may be pulsed for only a fraction of the 0.250 second duration needed to achieve Class 1 operation, when they are grouped together and pulsed sequentially a composite pulse can be generated which satisfies the 0.250 second threshold needed.

Within each laser source, the X-Y scanning assembly is replaced by a cylindrical lens arrangement which converts the fiber-fed beam source into a line segment capable of spanning either a portion of the width of the field—in which case at least two contiguous segments are required or the entire width of the field—in which case the lines may overlap (in the manner shown in the arrangement of FIG. 6).

It will be readily appreciated by those skilled in the art that various modifications and enhancements are possible. For example, there is no requirement that any pair of laser sources, as first and second laser sources 120a and 120b, be located along a line transverse and perpendicular to the lateral sidelines of the field. Thus, for example, the first laser source might be outside the first lateral side of field region 102b at the twenty-yard line and the second laser source might be outside the second lateral side of region 102b at the thirty-yard line. Still another laser source of the same group might be outside the second lateral side of region 102b at the ten-yard line, such that all or any two laser sources of the group might be used to generate a visible composite line in accordance with the present invention.

Nor is their any requirement that the laser sources be located at the same elevated vertical position relative to the field. It suffices to say that it is considered to be within the level of skill of the ordinary artisan to obtain, whether empirically or by calculation, a juxtaposition of laser sources that is ideally suited to the specific lighting conditions and overall dimensions associated with any particular indoor or outdoor location.

Figure 8:
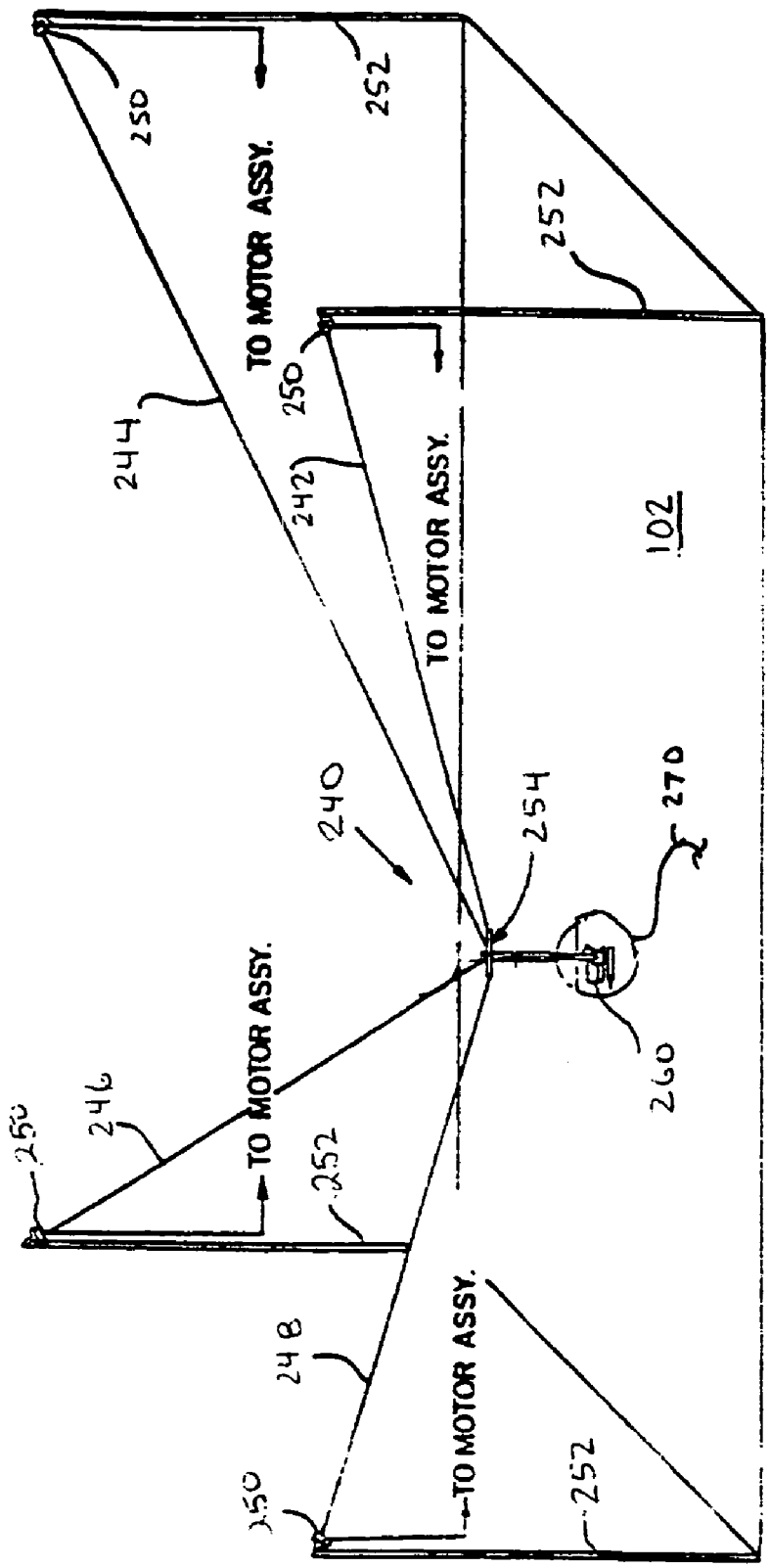
FIG. 8 is a schematic diagram depicting an alternative embodiment of the present invention in which the projection module is a fiber fed and suspended by a movable structure.

Turning now to FIG. 8, there is disclosed an embodiment of the present invention in which at least one fiber-fed projection module indicated generally at 230 is supported at an elevated location above target surface 102 by a suspension system 240 adapted to support and transport the fiber fed projection module to various locations as needed to project the line or other image at a desired region of the target surface. A suitable suspension system which may be utilized to realize a line/image projection system in accordance with the present invention is shown and described in U.S. Pat. No. 4,710,819 entitled "SUSPENSION SYSTEM FOR SUPPORTING AND CONVEYING EQUIPMENT, SUCH AS A CAMERA" and issued to Garret W. Brown on Dec. 1, 1987, which patent is expressly incorporated herein by reference in its entirety.

Referring to FIG. 8, suspension system 240 includes four cables 242, 244, 246 and 248, each of which is suspended over a pulley 250 connected to a respective support structure 252. Each of the cables has one of its ends attached to an equipment support member 254 which, in the preferred embodiment of this invention, is a multi-axis gimbal. Gimbal 254 is, in turn, attached to projection module 260, details of which are identical to projection module 125 depicted in FIG. 4 described previously in this application.

In operation, the movement and/or acceleration of the fiber-fed module by the suspension system 240 may impart pendular movement to said assembly and thereby cause it to deviate from its desired vertical orientation. As described in detail in the Brown patent, sensors are employed to monitor the angular orientation of projection module 260 relative to a preferred orientation and with respect to first and second axes of rotation. In order to preserve, or to reestablish the desired orientation of the assembly, a drive system comprising first and second servo motors (not shown) are actuated to oppose any undesired movement by exerting an opposing torque against the tension force applied to gimbal 254 by the connecting cables 242, 244, 246 and 248. Although the servo motors could be remotely controlled by an operator, it is preferred to employ sensing means for automatically actuating the motors in response to a detected, undesired angular deviation of the camera assembly from a desired orientation. A thorough description of the suspension system depicted in FIG. 8 is provided in the aforementioned Brown patent and, as such, the details of the same are omitted herein for clarity. It suffices to say that the suspension system 240 enables the projection module to be maintained at an elevated location from which an image, such as a line, can be projected onto a first region the target surface 102 and, as desired, moved to another elevated location from which a line or other image may be projected onto a second region of the target surface, with the angular orientation of the projection module being stabilized to prevent jittery movements of the projected image.

It will be readily appreciated by those skilled in the art that projection module 260 need not comprise The apparatus according to claim 1, wherein said first projection module comprises an X-Y scanning assembly, the X-Y scanning assembly being operative, in accordance with a first mode of operation, to project a temporary, visible reference line across the target surface and operative, in accordance with a second mode of operation, to project a temporary visible image having at least one curvilinear segment.

The embodiment of FIG. 8 admits of substantial variations that provide increased utility over the fixed embodiments discussed in connection with FIGS. 1-7 above. For example, by employing a plurality of independently suspended projection modules, it is possible to project light within a first plane that extends vertically upward from the goal line of a football field using a first projection module 260 and, simultaneously, to project light within a second plane that extends vertically upward from the first down line using a second projection module (not shown). Likewise, it is possible to position the first and second projection modules in alignment with the respective outer boundaries of the field goal posts—making it easy for the fans to see a missed field goal attempt.

It should also be noted that additional projection modules may be supported by the same suspension system. For example, in the event one projection module or its associated laser(s) were to fail, a back-up projection module may be energized so as to ensure continued operation. As well, where a single projection module fed by a single wavelength laser source would be capable of projecting only a monochromatic image, a plurality of projection modules—each fed by a respective laser source emitting light at a correspondingly different wavelength—would be capable of projecting multicolored images. Such an arrangement would be especially advantageous during night games where wavelengths less visible during the day might be easily seen when projected upon an athletic field. An arrangement constructed in accordance with this modified embodiment would thus be operative in a first mode, during which a first projection module projects a monochromatic line upon the target surface and in a second mode, during which a plurality of projection modules project a polychromatic or multi-colored image upon the target surface.

As noted above, projection module 260 receives optical energy from one or more remotely located laser units via an optical fiber. In addition to the optical fiber, cable 270 contains a power transfer cable to supply power and control signals to the X-Y scanners (where such components are used). Preferably, the optical fiber is disposed within a protective umbilical cable 270 that is strengthened to prevent damage as a result of bending, wind, etc. Cable 270 must also be resistant to the effects of moisture.

It will be apparent to those skilled in the art that various modifications and variations can be 20 made to the present invention without departing from the spirit and scope of the invention. Thus, it is intended that the present invention cover the modifications and variations of this invention provided they come within the scope of the appended claims and their equivalents.

What is claimed is:

1. An apparatus for providing a temporary visible image upon a target surface, comprising:

at least one laser operative to emit optical energy;

a first projection module optically coupled to said at least one laser, said first projection module being dimensioned and arranged to project optical energy received from said at least one laser downwardly onto the target surface;

and a suspension system for supporting said first projection module at an elevated location above the target surface and for conveying said first projection module in response to user input commands, said suspension system including a position stabilization system adapted to detect and correct angular deviations relative to a desired orientation of the first projection module, whereby said first projection module may be conveyed from a first, position-stabilized location from which an image can be projected upon a first region of the target surface to a second, position-stabilized location from which an image can be projected upon a second region of the target surface, wherein said first projection module includes a lens dimensioned and arranged to spread the optical energy received from said at least one laser into a first straight line extending between opposite lateral sides of the target surface, and wherein said at least one laser is operative to emit a sufficient amount of optical energy such that said first projection module projects therefrom an image that is visible during daylight ambient lighting conditions.

2. The apparatus according to claim 1, wherein said at least one laser includes a plurality of lasers operative to emit optical energy at a wavelength of between 380 and 750 nm.

3. The apparatus according to claim 2 further including a control module configured to operate each of said plurality of lasers to produce respective sequences of pulses less than 0.25 seconds in duration and to aggregate corresponding pulses from each laser so as to supply a series of composite pulses at least 0.25 seconds in duration to said first projection module.

4. The apparatus according to claim 1, further including a control module configured to operate said at least one laser.

5. The apparatus according to claim 1, further including a second projection module supported and conveyed by said suspension system.

6. The apparatus according to claim 1, further including a second projection module;

at least a second laser optically coupled to said second projection module; and a second suspension system for supporting said second projection module at an elevated location above the target surface and for conveying said second projection module in response to user input commands, said second suspension system including a position stabilization system adapted to detect and correct angular deviations relative to a desired orientation of the second projection module, wherein said second projection module includes a lens dimensioned and arranged to spread the optical energy received from said at least a second laser into a second straight line extending between opposite lateral sides of the target surface and colinear with the first straight line.

7. An apparatus for providing a temporary visible image upon a target surface, comprising:
- a plurality of lasers each operative to emit optical energy at a wavelength of between 380 and 750 nm;
- first and second projection modules optically coupled to said plurality of lasers, said first projection module being adapted to project optical energy received from said plurality of lasers downwardly onto the target surface;
- a controller responsive to input user commands to operate, in accordance with a first mode of operation, the first projection module and at least one of said plurality of lasers to project a straight, visible reference line upon the target surface and to operate, in accordance with a second mode of operation, the first and second projection modules and said plurality of lasers to project a temporary, visible, multicolored image upon the target surface;
- and a suspension system for supporting said first projection module at an elevated location above the target surface and for conveying said first projection module in response to user input commands, said suspension system including a position stabilization system adapted to detect and correct angular deviations relative to a desired orientation of the first projection module,
- wherein said plurality of lasers are operative to emit a sufficient amount of optical energy such that the reference line projected by said first projection module is visible during daylight ambient lighting conditions, and
- wherein each of said first and second projection modules includes a corresponding X-Y scanning assembly operative to project optical energy along selectable paths upon the target surface,
- whereby said first projection module may be conveyed from a first, position-stabilized location from which the reference line can be projected upon a first region of the target surface to a second, position-stabilized location from which the reference line can be projected upon a second region of the target surface.

8. The apparatus according to claim 7, wherein a first and a second of said plurality of lasers are adapted to emit optical energy at a respectively different wavelength between 380 nm and 750 nm.

9. The apparatus according to claim 8, wherein said first and second projection modules and said first and second lasers are operative, in accordance with said second mode of operation, to project a multicolored image having at least one curvilinear portion.

10. The apparatus according to claim 8, wherein said first projection module and the first laser are operative, in accordance with said first mode of operation, to project a continuous temporary line having a length of about fifty three yards.

11. A method, comprising the steps of:
- responsive to receiving a command to generate a temporary visible image upon a first selected region of grass-covered athletic field, conveying a projection module suspended above the grass-covered athletic field and optically coupled to at least one laser to a first location;
- operating the projection module and at least one laser so as to project, during daylight ambient conditions, the visible image upon the first selected region and
- while performing said operating step, detecting and correcting angular deviations relative to a desired orientation of the projection module to substantially fix the visible image at the first selected region for a desired time interval.

12. The method of claim 11, further including a step of responsive to receiving a command to generate a temporary visible image upon a second selected region of the grass-covered athletic field, conveying the projection module from the first location to a second location above the grass-covered athletic field; and operating the projection module and at least one laser so as to project a visible image upon the second selected region.

13. The method of claim 11, wherein said projection module includes an X-Y scanning assembly and said method further includes a step of operating said projection module, in accordance with a first mode of operation, to project a temporary, visible reference line upon the grass-covered athletic field, and a step of operating said projection module, in accordance with a second mode of operation, to project a temporary visible image having at least one curvilinear segment upon the grass-covered athletic field.

14. The method of claim 11, wherein said projection module is optically coupled to a plurality of lasers operating at respectively different wavelengths between 380 and 750 nm, said method further comprising a step of operating said projection module and plurality of lasers to project a multicolored, temporary visible image upon the grass-covered athletic field.

15. The method of claim 11, wherein the step of operating the projection module includes spreading the optical energy supplied by the at least one laser into a straight line image using a cylindrical lens.

16. The method of claim 11, wherein the step of operating comprises operating a plurality of lasers sequentially to form a series of composite pulses each having a duration of at least 0.25 seconds.

17. The method of claim 11, wherein during said step of conveying, first and second projection modules each optically coupled to a corresponding laser and suspended above the grass-covered athletic field are moved independently of each other to first and second locations, respectively; and wherein during said step of operating, the first and second projection modules and the plurality of lasers are operated so as to project, during daylight ambient conditions, the visible image.

* * * * *